US008872104B2

(12) United States Patent
Langridge et al.

(10) Patent No.: US 8,872,104 B2

(45) Date of Patent: Oct. 28, 2014

(54) SEGMENTED PLANAR CALIBRATION FOR CORRECTION OF ERRORS IN TIME OF FLIGHT MASS SPECTROMETERS

(75) Inventors: David J. Langridge, Stockport (GB); Jason Lee Wildgoose, Stockport (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 14/117,756

(22) PCT Filed: May 16, 2012

(86) PCT No.: PCT/GB2012/051099

§ 371 (c)(1), (2), (4) Date: Apr. 15, 2014

(87) PCT Pub. No.: WO2012/156738

PCT Pub. Date: Nov. 22, 2012

(65) Prior Publication Data

US 2014/0246575 A1 Sep. 4, 2014

Related U.S. Application Data

(60) Provisional application No. 61/488,279, filed on May 20, 2011.

(30) Foreign Application Priority Data

May 16, 2011 (GB) .................................. 1108082.7

(51) Int. Cl.

*B01D 59/44* (2006.01)
*H01J 49/00* (2006.01)
*H01J 49/02* (2006.01)

(52) U.S. Cl.

CPC ............ *H01J 49/0009* (2013.01); *H01J 49/02* (2013.01)

USPC ........... 250/282; 250/281; 250/283; 250/287; 250/288; 250/289; 250/290; 250/291; 250/292

(58) Field of Classification Search

USPC .................................. 250/281–283, 287–292

See application file for complete search history.

(56) References Cited

U.S. PATENT DOCUMENTS 5,347,132 A 9/1994 Holzman et al.
5,654,544 A * 8/1997 Dresch .......................... 250/287

(Continued)

FOREIGN PATENT DOCUMENTS

DE 10162267 7/2003
WO 9807179 2/1998

(Continued)

OTHER PUBLICATIONS

Wiley et al., "*Time-of-Flight Mass Spectrometer With Improved Resolution*" The Review of Scientific Instruments, vol. 26, No. 12, pp. 1150-1157, 1955.

*Primary Examiner* — Jack Berman
*Assistant Examiner* — Meenakshi Sahu
(74) *Attorney, Agent, or Firm* — Diederiks & Whitelaw, PLC

(57) ABSTRACT

An ion detector system for a mass spectrometer is disclosed comprising an ion detector comprising an array of detector elements. The ion detector system is arranged to correct for tilt and non-linear aberrations in an isochronous plane of ions. The ion detector system generates separate first mass spectral data sets for each detector element and then applies a calibration coefficient to each of the first mass spectral data sets to produce a plurality of second calibrated mass spectral data sets. The plurality of second calibrated mass spectral data sets are then combined to form a composite mass spectral data set.

17 Claims, 9 Drawing Sheets

(56) References Cited

U.S. PATENT DOCUMENTS

| | | | | |
|---|---|---|---|---|
| 5,847,385 | A * | 12/1998 | Dresch .......................... | 250/287 |
| 7,217,918 | B1 | 5/2007 | Funsten et al. | |
| 2014/0054454 | A1* | 2/2014 | Hoyes et al. .................. | 250/282 |

FOREIGN PATENT DOCUMENTS

| | | |
|---|---|---|
| WO | 03058673 | 7/2003 |
| WO | 2012156738 | 11/2012 |

* cited by examiner

Fig. 6(Cont. I)
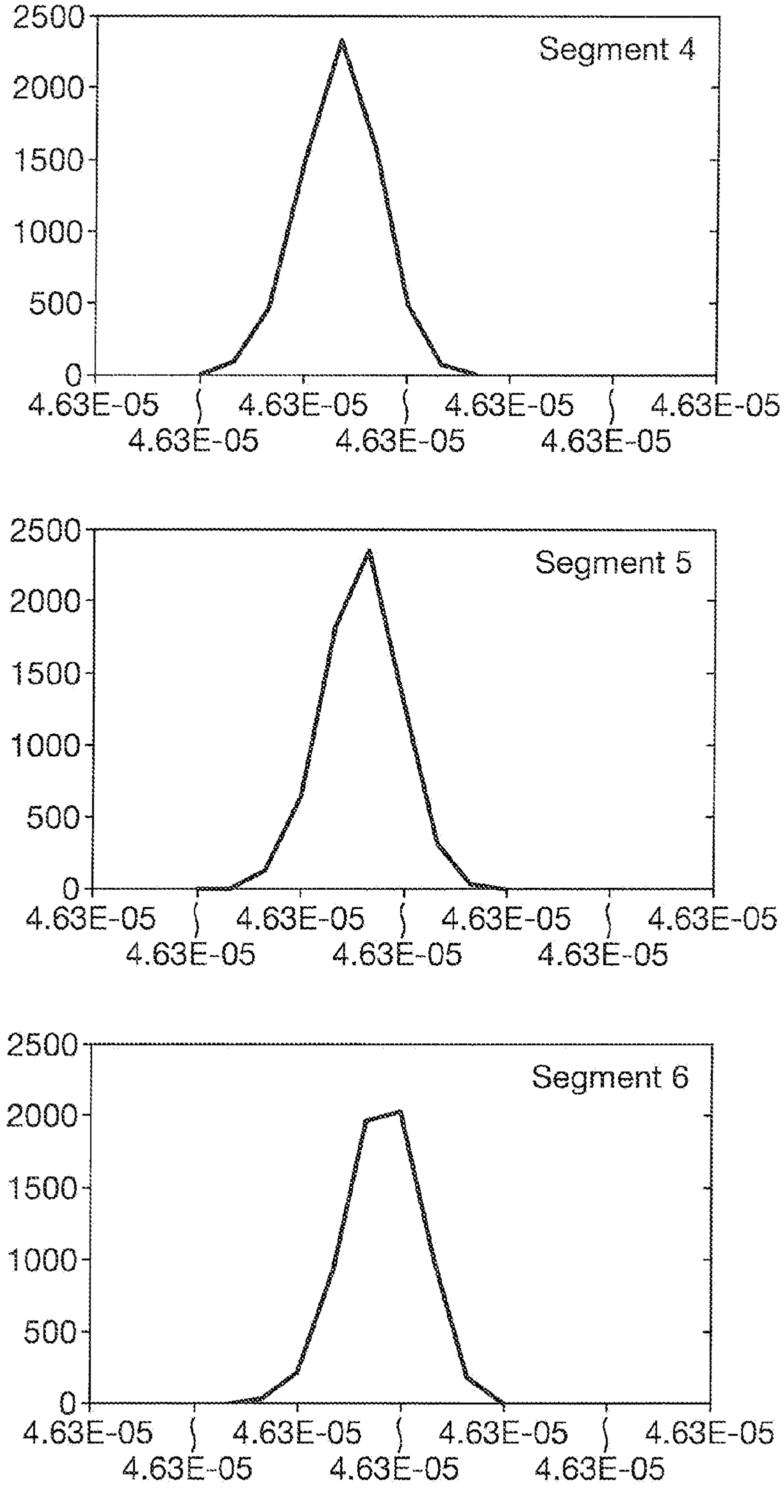

Fig. 6(Cont. II)
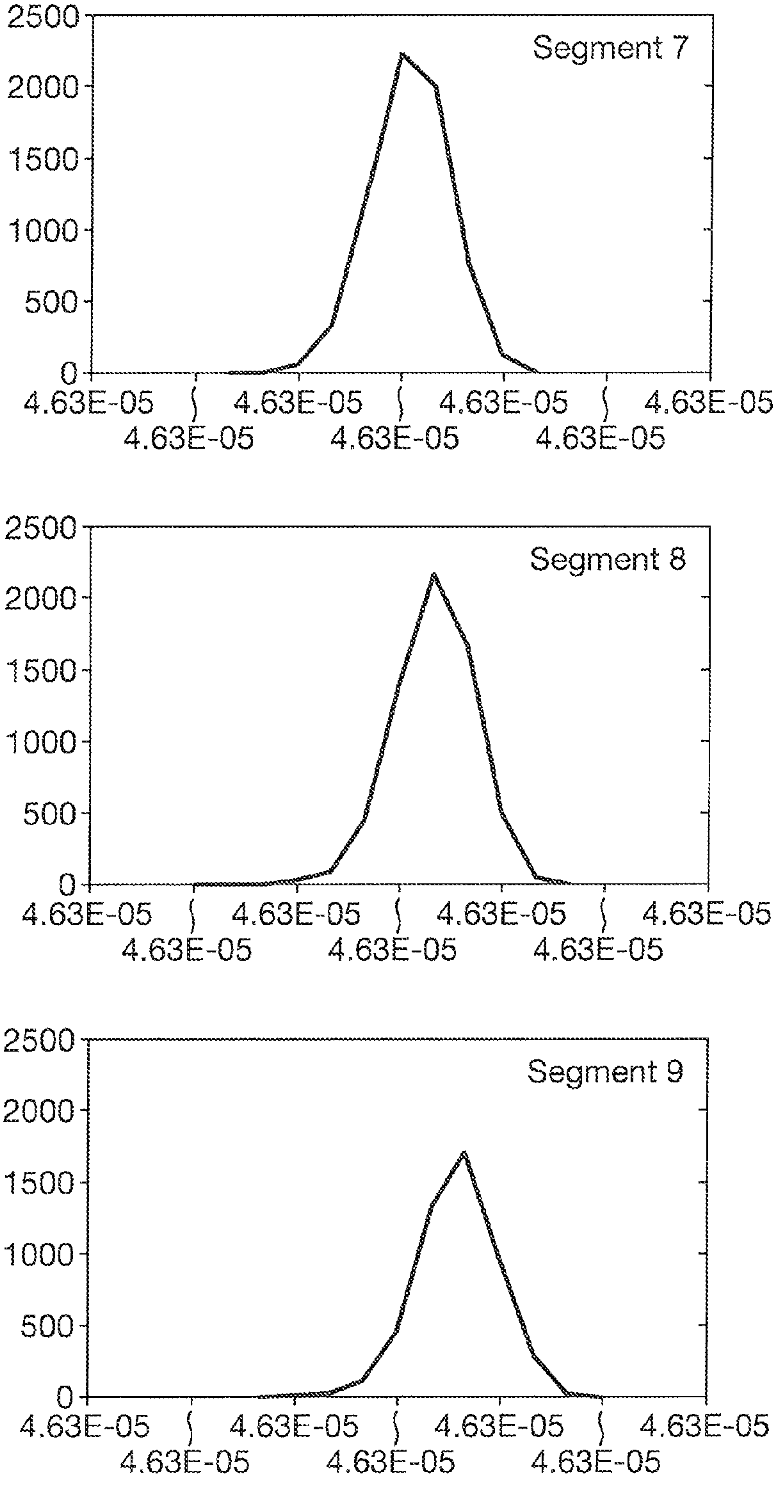

SEGMENTED PLANAR CALIBRATION FOR CORRECTION OF ERRORS IN TIME OF FLIGHT MASS SPECTROMETERS

CROSS REFERENCE TO RELATED APPLICATIONS

This application is the National Stage of International Application No. PCT/GB2012/051099, filed 16 May 2012, which claims priority from and the benefit of U.S. Provisional Patent Application Ser. No. 61/488,279 filed on 20 May 2011 and United Kingdom Patent Application No. 1108082.7 filed on 16 May 2011. The entire contents of these applications are incorporated herein by reference.

BACKGROUND OF THE INVENTION

The present invention relates to an ion detector, a mass spectrometer, a method of detecting ions and a method of mass spectrometry. U.S. Pat. No. 5,654,544 and U.S. Pat. No. 5,847,385 disclose using electrostatic deflectors in a Time of Flight mass spectrometer to steer ions into a detector positioned at the end of the drift region. The detector assembly is tilted in relation to the steered ion beam in a manner which improves mass spectral resolution.

The Applicants have developed a mechanical gimbal which may be used to correct for loss of mass spectral resolution. However, this requires a relatively complex movement stage which must be operated under vacuum conditions.

It is known to use electrical means to attempt to correct for loss of mass spectral resolution but such approaches require additional power supplies, grids and vacuum feed throughs.

It is therefore desired to provide an improved mass spectrometer and in particular an improved ion detector system.

SUMMARY OF THE INVENTION

According to an aspect of the present invention there is provided an ion detector system for a mass spectrometer comprising:

an ion detector comprising an array of detector elements, wherein the ion detector system is arranged and adapted to correct for tilt and/or one or more non-linear aberrations in one or more isochronous planes of ions.

The isochronous plane preferably comprises the plane of best fit of ions having a particular mass to charge ratio at a particular point in time.

The tilt in the one or more isochronous planes preferably results from misalignment of one or more ion-optical components.

According to an embodiment the one or more non-linear aberrations may comprise bowing, rippling or flatness effects due to one or more ion-optical components and/or in one or more isochronous planes of ions.

Separate first mass spectral data is preferably generated for each detector element.

The ion detector system is preferably arranged and adapted to correct each of the first mass spectral data individually to produce a plurality of second corrected or calibrated mass spectral data.

The ion detector system is preferably arranged and adapted to combine the plurality of second corrected or calibrated mass spectral data to form a composite mass spectral data set.

The composite mass spectral data set preferably relates to a single arrival event corresponding with a plurality of ions arriving at the ion detector at an instance in time.

The detector system is preferably arranged and adapted to generate a final mass spectrum by combining multiple composite mass spectral data sets.

The array of detector elements preferably comprises a 1D or 2D array of detector elements.

According to another aspect of the present invention there is provided a Time of Flight mass analyser comprising an ion detector system as described above.

The Time of Flight mass analyser may comprise an axial acceleration Time of Flight mass analyser. However, more preferably, the Time of Flight mass analyser may comprise an orthogonal acceleration Time of Flight mass analyser.

The Time of Flight mass analyser preferably further comprises a pusher or puller electrode and a first grid or other electrode with a first field free region arranged between the pusher or puller electrode and the first grid or other electrode. A second grid or other electrode may be provided and a second field free region may be arranged between the first grid or other electrode and the second grid or other electrode. An orthogonal acceleration region is preferably arranged downstream of the second grid or other electrode.

A device may be provided upstream of the orthogonal acceleration region and is preferably arranged and adapted to introduce a first order spatial focusing term in order to improve spatial focusing of a beam of ions.

A beam expander may be arranged upstream of the orthogonal acceleration region, the beam expander being arranged and adapted to reduce an initial spread of velocities of ions arriving at the orthogonal acceleration region.

According to an embodiment a gimbal comprising two inclined electrodes may be provided. The gimbal is preferably located in the first field free region, the second field free region or the orthogonal acceleration region. The gimbal is preferably arranged and adapted to correct for a linear or first order effect resulting from misalignment of one or more ion-optical components.

According to another aspect of the present invention there is provided a mass spectrometer comprising a Time of Flight mass analyser as described above.

According to another aspect of the present invention there is provided a method of detecting ions comprising:

providing an ion detector system comprising an array of detector elements; and using the ion detector system to correct for tilt and/or one or more non-linear aberrations in one or more isochronous planes of ions.

According to another aspect of the present invention there is provided a method of calibrating an ion detector comprising:

providing an ion detector comprising an array of detector elements;

detecting calibrant ions using the array of detector elements;

determining for each of the detector elements a time of flight of the calibrant ions; and determining a time of flight correction, a time of flight adjustment or a time of flight calibration coefficient for each detector element so that in subsequent operation the ion detector is arranged and adapted to correct for the effects of tilt and/or one or more non-linear aberrations in one or more isochronous planes of ions.

According to another aspect of the present invention there is provided an ion detector system for a mass spectrometer, wherein the ion detector system is arranged and adapted to correct for tilt and/or one or more non-linear aberrations in an isochronous plane of ions, wherein the isochronous plane is the plane of best fit of ions having a particular mass to charge ratio at a particular point in time;

wherein the ion detector system comprises an ion detector comprising a 1D or 2D array of detector elements; and wherein the ion detector system is arranged and adapted:

(i) to generate separate first mass spectral data sets for each detector element;

(ii) to apply a calibration coefficient to each of the first mass spectral data sets to produce a plurality of second calibrated mass spectral data sets; and (iii) to combine the plurality of second calibrated mass spectral data sets to form a composite mass spectral data set.

According to another aspect of the present invention there is provided a method of detecting ions, wherein the method corrects for tilt and/or one or more non-linear aberrations in an isochronous plane of ions, wherein the isochronous plane is the plane of best fit of ions having a particular mass to charge ratio at a particular point in time;

the method comprising providing an ion detector system comprising an ion detector comprising a 1D or 2D array of detector elements; and wherein the method further comprises:

(i) generating separate first mass spectral data sets for each detector element;

(ii) applying a calibration coefficient to each of the first mass spectral data sets to produce a plurality of second calibrated mass spectral data sets; and (iii) combining the plurality of second calibrated mass spectral data sets to form a composite mass spectral data set.

According to an aspect of the present invention there is provided an apparatus and method for correcting for undesirable planar-position dependent time of flight measurements that adversely effect resolution. The preferred embodiment employs a post ion detection calibration approach.

The preferred embodiment relates to an improvement to existing apparatus, specifically Time of Flight mass analyzers. The preferred embodiment corrects for errors in mechanical alignment of one or more optical components that make up a Time of Flight instrument and, to some extent, undesirable electrical effects of the optical components that make up a Time of Flight instrument.

According to an embodiment mechanical misalignments in the ion optical components of a Time of Flight mass analyser are compensated for by maintaining the two dimensional spatial information of the Time of Flight ion packet in the two dimensions orthogonal to the Time of Flight axis. Each region of the two dimensional space is individually calibrated. The mass spectral data is then preferably combined with mass spectral data from other regions thereby providing a means of correcting for small mechanical misalignments.

The preferred embodiment allows for a relaxation of parallelism and flatness tolerances in the construction of a Time of Flight instrument. The tolerance effects can be compensated for improving the instrument resolution. The potential cost savings for reduced tolerance build analyzers are considerable.

The preferred embodiment seeks to solve the problem of planar-position (substantially orthogonal to the time of flight axis) dependent time of flight measurements such as those created by the imperfect alignment of Time of Flight mass analyser components.

In a co-pending patent application PCT/GB2012/050549 (Micromass) a way of correcting for such distortion is disclosed and is concerned with locating a tilted component or gimbal within the Time of Flight mass analyser. Such an approach is able to correct for tilts. The preferred embodiment is particularly advantageous in that it is able to correct for more complex aberrations other than tilts including, for example, aberrations due to bowing, rippling and flatness effects. The preferred embodiment is therefore particularly advantageous compared with using a gimbal or a tiltable detector.

According to an embodiment the mass spectrometer may further comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; and (xx) a Glow Discharge ("GD") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) one or more energy analysers or electrostatic energy analysers; and/or (h) one or more ion detectors; and/or (i) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wein filter; and/or (j) a device or ion gate for pulsing ions; and/or (k) a device for converting a substantially continuous ion beam into a pulsed ion beam.

The mass spectrometer may further comprise a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

BRIEF DESCRIPTION OF THE DRAWINGS

Various embodiments of the present invention will now be described, by way of example only, and with reference to the accompanying drawings in which.

DETAILED DESCRIPTION OF THE PREFERRED EMBODIMENTS

It is well known to those skilled in the art of Time of Flight design that one of the factors that limit the resolution of Time of Flight mass spectrometers is the optical alignment between the various components that make up the Time of Flight mass analyzer. This is especially important in orthogonal acceleration Time of Flight ("oa-TOF") mass spectrometers which commonly comprise of a set of parallel electric field regions which are delineated by a series of meshes or grids with precise mechanical separation. The location of these optical components are known as the principal planes of the Time of Flight mass spectrometer. Particular attention is paid to the parallelism and flatness of the principal planes which are commonly aligned to within a few microns to ensure high mass resolution.

In 1955 Wiley and McLaren set out the mathematical formalism upon which subsequent Time of Flight instruments have been designed. Reference is made to: "Time-of-Flight Mass Spectrometer with improved Resolution", Rev. Sci. Instrum. 26, 1150 (1955).

Figure 1A:
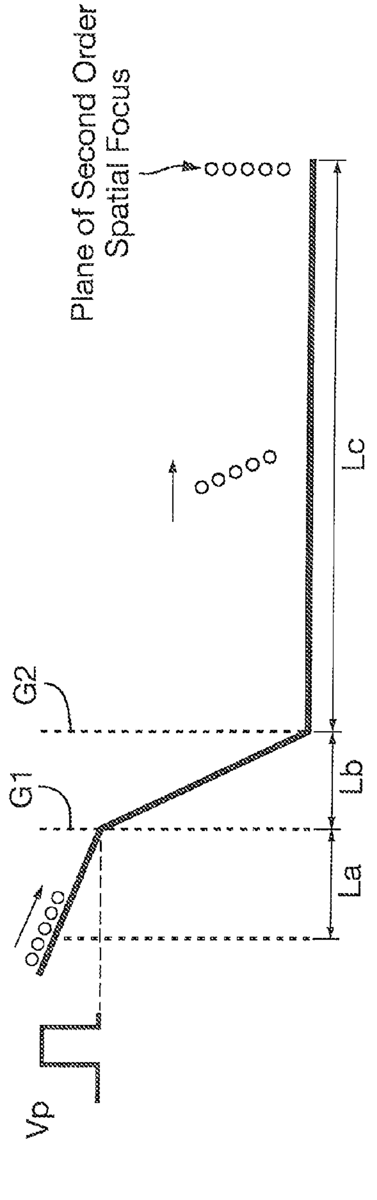
Fig. 1A Prior Art
FIG. 1A shows the known principles of space focusing in a linear or axial acceleration Time of Flight mass spectrometer and FIG. 1B shows the principles of space focusing in a reflectron Time of Flight mass spectrometer.

The concept of compacting an initial positional distribution of ions by combination of acceleration and drift regions is known as spatial focusing. FIG. 1A shows a potential energy diagram relating to a known arrangement wherein by using two distinct electric field regions (the first of which is pulsed to an accelerating potential Vp) followed by a drift tube (held at Vtof), the initial ion beam may be compacted to a narrower spatial distribution in the z- or axial direction at the plane of the ion detector. The ratio of the magnitudes and distances of the two electric fields and the length of the field free drift region are set precisely in accordance with the principle of spatial focusing as set out in the Wiley McLaren paper.

Figure 1B:
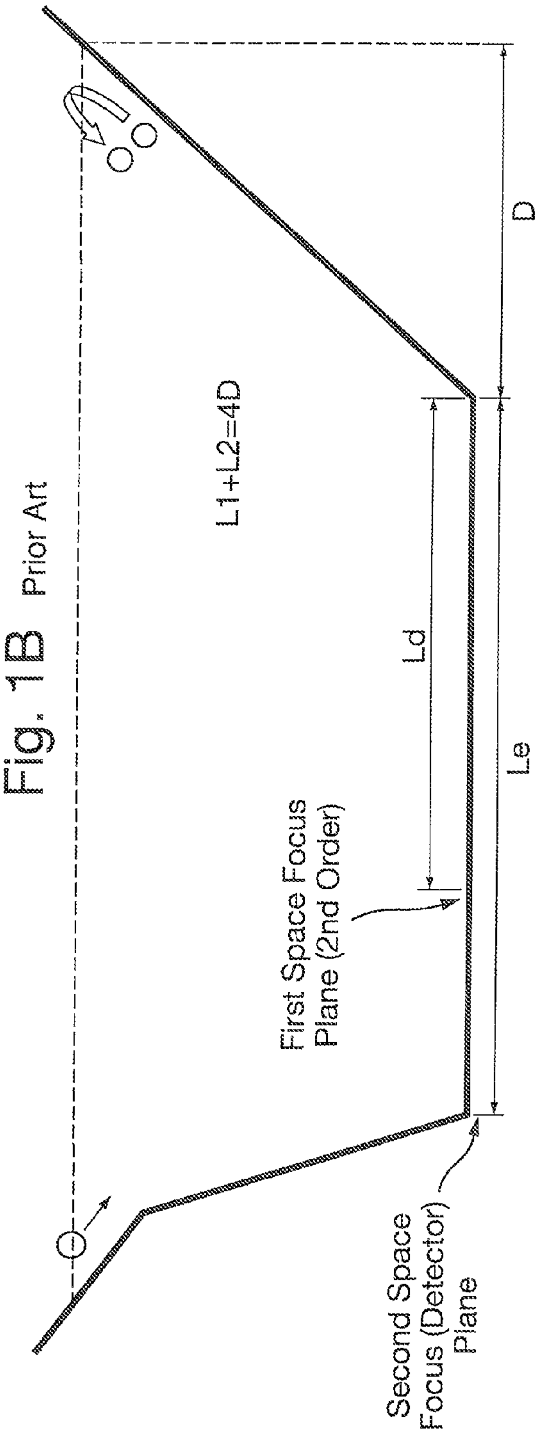
Fig. 1B Prior Art

It is also known that the addition of a reflectron can provide for spatial focusing in a folded geometry instrument that provides for longer flight times and higher resolution. FIG. 1B shows a potential energy diagram of a refection Time of Flight mass analyser. The following description of the preferred embodiment is equally applicable to both linear and reflectron based geometries.

Figure 2:
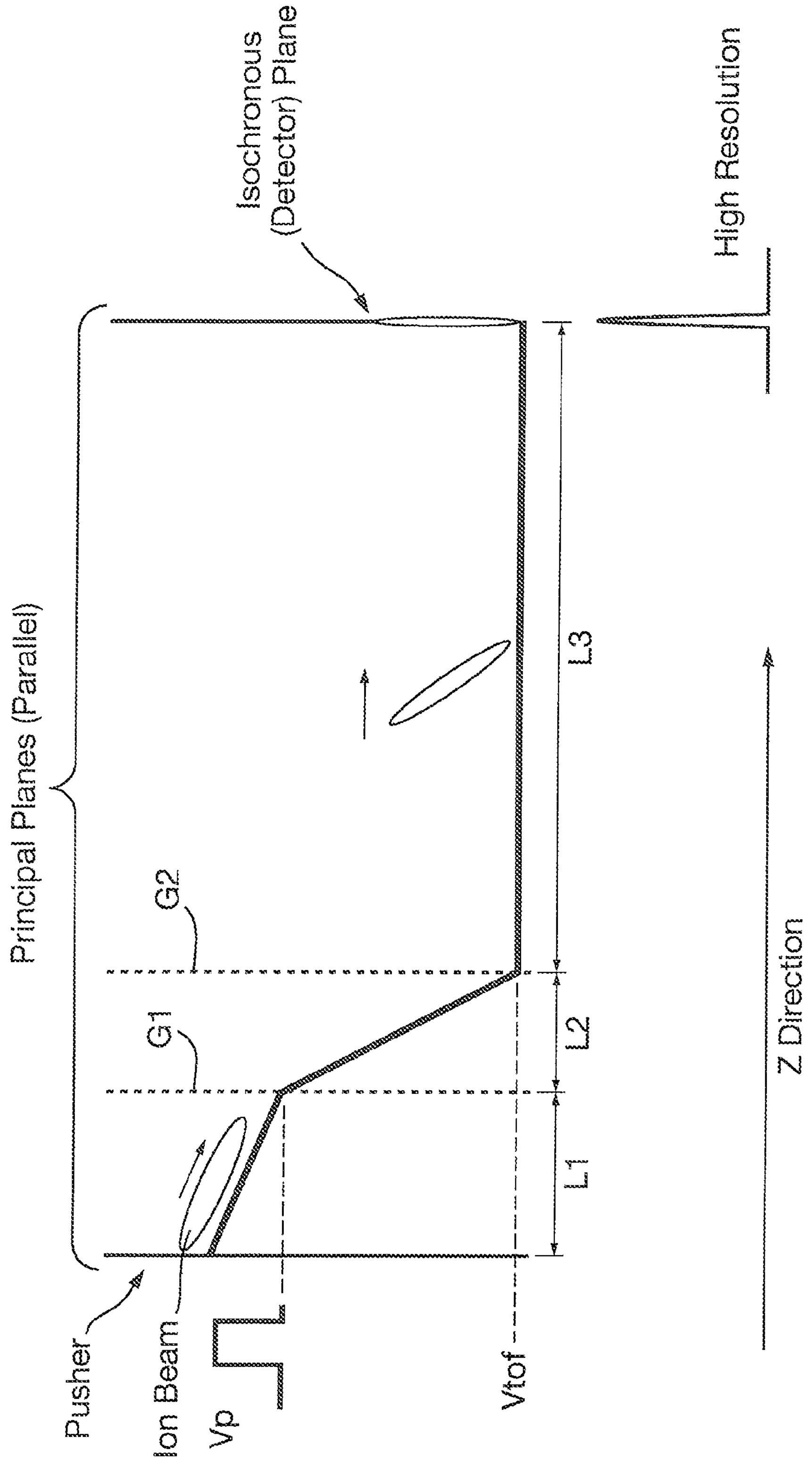
Fig. 2 Prior Art
FIG. 2 shows a known two stage Wiley McLaren orthogonal acceleration Time of Flight mass analyser showing principal planes.

In a two stage geometry as shown in FIG. 2 the principal planes which define the instrument geometry are the pusher electrode, the two grid electrodes G1,G2 and the ion detector. For highest mass resolution these principal planes should be as flat and as parallel as possible. Modern instruments employing reflectrons achieve resolutions of 50,000 or more and require overall parallelism of better than 10 microns throughout the instrument and across the entire transverse beam trajectory. Such a high degree of tolerance requires precise machining over large distances and is therefore expensive and difficult to achieve consistently.

Figure 3:
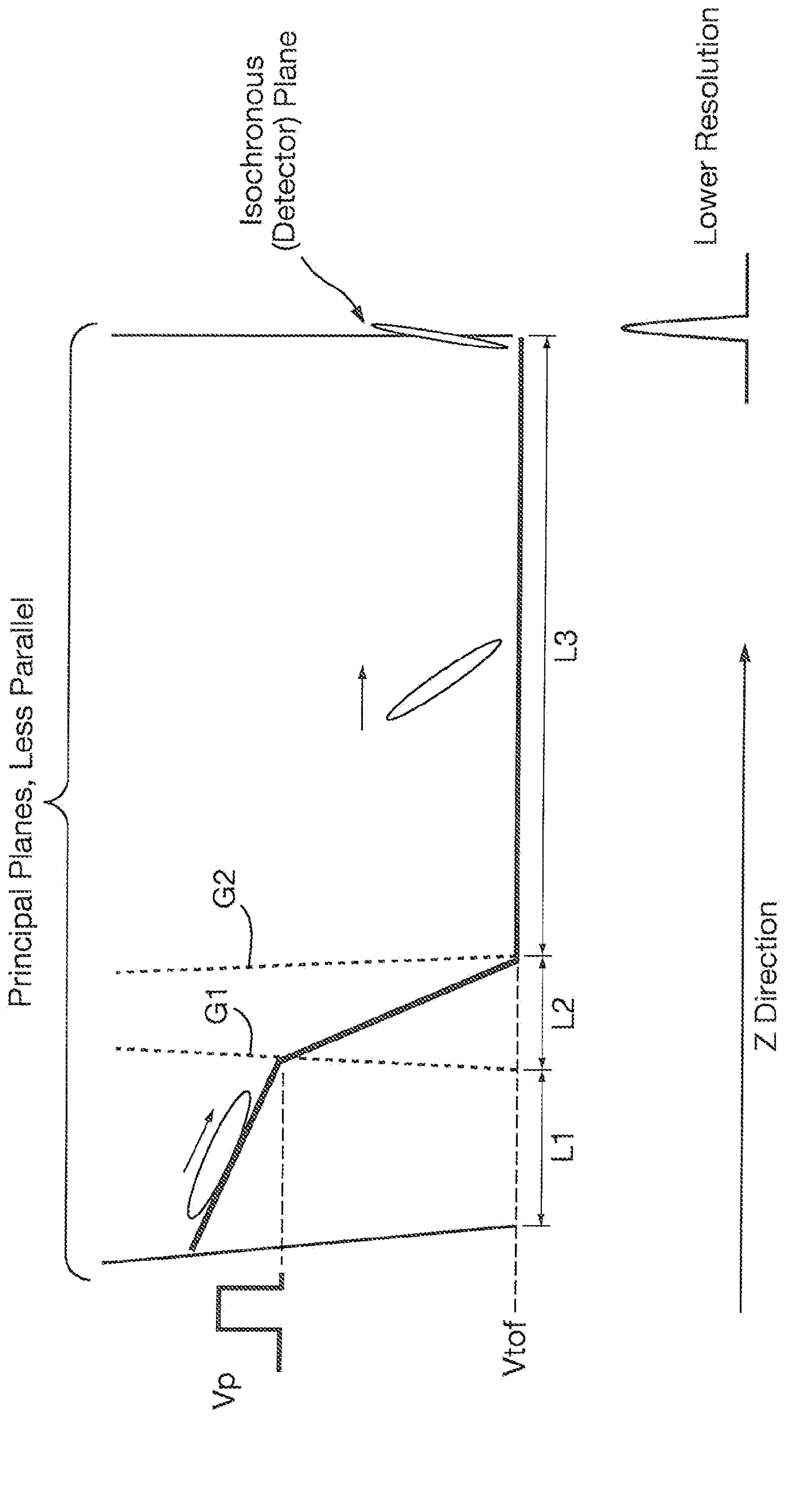
Fig. 3 Prior Art
FIG. 3 shows how misaligned principal planes lead to a distortion in the isochronous plane at the ion detector.

FIG. 3 shows how misaligned principal planes lead to a distortion in the isochronous plane at the ion detector thus degrading instrumental resolution. Unless the magnitude and direction of the misalignments of each of the principal planes is known precisely then their quantitative cumulative effect on Time of Flight resolution cannot be predicted.

It is known to those skilled in the art that small variations in the z- or axial position of the principal planes can be corrected by making small changes in the applied voltage that create the electric fields. This is because the solutions for spatial focusing do not depend upon exact distances but rather upon a combination of distance and fields and hence a change in one can compensate for an error in the other.

However, in the transverse x- and y-directions no such degree of freedom exists and computer modeling reveals that a convolution of a multiplicity of such small tilts in the x- and y-directions of the principal planes lead to an overall tilt in the isochronous plane at the ion detector. Although x- and y-tilts are not inherently correctable by adjusting the voltages of the components at the principal planes, opposite sense variations can go some way to cancelling each other out. However, this is unpredictable due to the fact that the engineering tolerances of a spectrometer lead to unpredictable angular variations (x- and y-tilt) in the principal planes and therefore a spread of measured resolutions is observed in a population of instruments.

In a co-pending patent application PCT/GB2012/050549 (Micromass) a way of correcting for such distortion is disclosed and is concerned with locating a tilted component or gimbal within the Time of Flight mass analyser. By adjusting the tilt of the component in the x- and y-directions it is possible to align the ion packet with the ion detector so that the distortion caused by misalignment of the principal plane components is minimized and therefore resolution is optimized. It is also possible to fix the tilt of the component and vary the applied potential thereby altering the time of flight in a position (x,y direction) dependent manner again aligning the ion packet with the ion detector. However, this approach requires high vacuum conditions. Furthermore, the gimbal represents an additional manufacturing cost and in certain situations the gimbal may be relatively difficult to adjust.

Although the provision of a gimbal as disclosed in PCT/GB2012/050549 provides significant advantages over conventional arrangements, the gimbal arrangement is effectively limited to correcting for first order aberrations wherein the time of flight varies linearly with position in the x- and/or y-directions.

The preferred embodiment of the present invention is concerned with providing a post ion detection method of compensating for these misalignments. Advantageously, the preferred embodiment has the benefit of optimizing the resolution of a mass spectrometer whilst relaxing the tolerances required for the positioning of the components at the principal planes. Furthermore, the preferred embodiment does not require any moving parts or the use of tunable voltages.

A yet further advantage of the preferred embodiment is that the apparatus and method according to the preferred embodiment is not limited to the correction of first order aberrations. A particularly advantageous aspect of the preferred embodiment is that the preferred embodiment may be used to correct for higher order or curved aberrations such as those generated by curved surfaces/grids, non-ideal fields and Time of Flight focusing lenses in the x- and/or y-directions.

The gimbal disclosed in PCT/GB2012/050549 (Micromass) as a way of correcting for such distortion is limited to the correction of tilts. The preferred embodiment is particularly advantageous in that it is able to correct for more complex aberrations other than tilts including, for example, aberrations due to bowing, rippling and flatness effects. The preferred embodiment is therefore particularly advantageous compared with using a gimbal or a tiltable detector.

Figure 4:
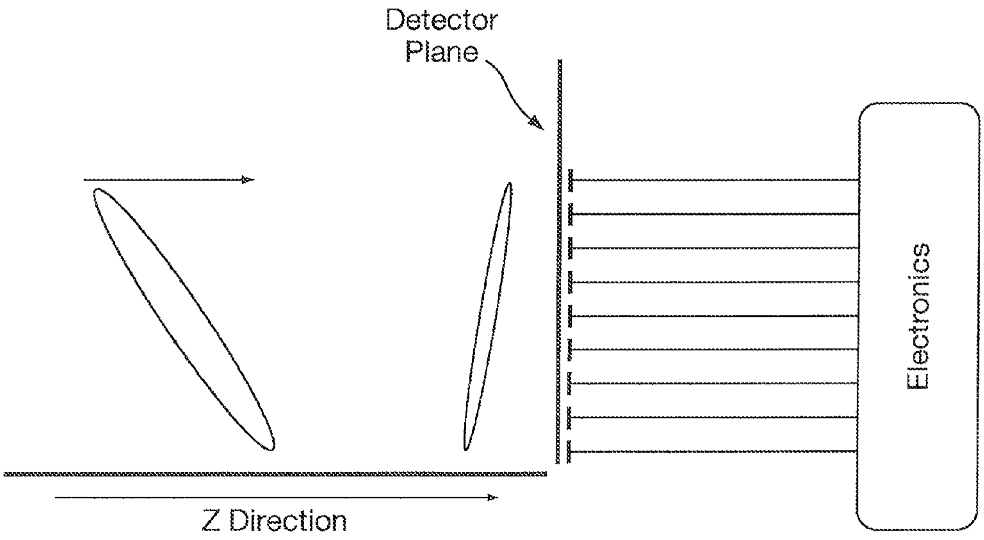
FIG. 4 shows an ion detector according to a preferred embodiment of the present invention comprising nine ion detection segments.

FIG. 4 shows a preferred embodiment of the present invention. According to an embodiment the ion detector is preferably segmented into a plurality of 1D or 2D segments. In the particular embodiment shown in FIG. 4 the ion detector comprises nine 1D or planar segments. An important aspect of the preferred embodiment is that there is an effective segmentation or division of the detector plane wherein the time of flight information for individual sub divisions are kept initially separate from each other.

Time of flight calibration coefficients for each sub division are preferably calculated and/or adjusted individually within the electronics. As a final step, adjusted or corrected mass spectral data from each of the detector segments is preferably combined to form a composite mass spectral data set. According to the preferred embodiment it is possible to correct for the previously described aberrations.

Various further aspects of the preferred embodiment will now be described in more detail with reference to FIGS. 5-7.

Figure 5A:
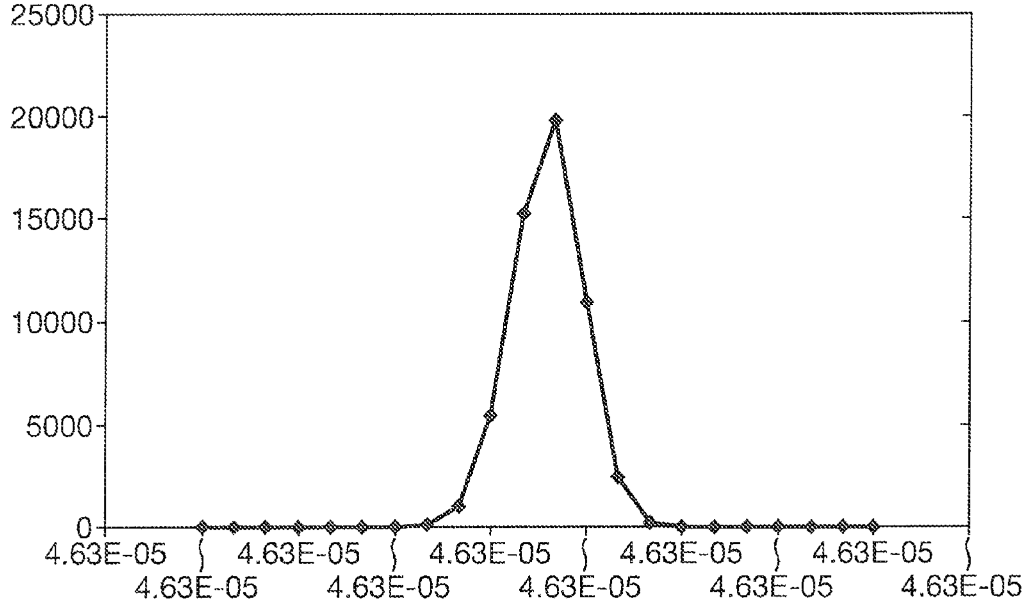
FIG. 5A shows the results of a simulation of an orthogonal acceleration Time of Flight mass spectrometer incorporating a Wiley-McLaren source and a dual stage reflection and FIG. 5B shows the results of a simulation after introducing a tilt along one axis of the ion beam.

FIG. 5A shows the results of a simulation of an orthogonal acceleration Time of Flight mass spectrometer incorporating a Wiley-McLaren source and a dual stage reflectron. The simulation includes realistic effects due to the initial energy spread and positional spread of ions prior to orthogonal acceleration, the scattering effects of the grids used to define the different regions within the Time of Flight analyser and the effects of an asynchronous 3 GHz acquisition system. The resolution of the mass spectral peak shown in FIG. 5A equates to approximately 28,000 (FWHM) at m/z 1000 and is representative of the resolutions achieved on real systems of this geometry.

Figure 5B:
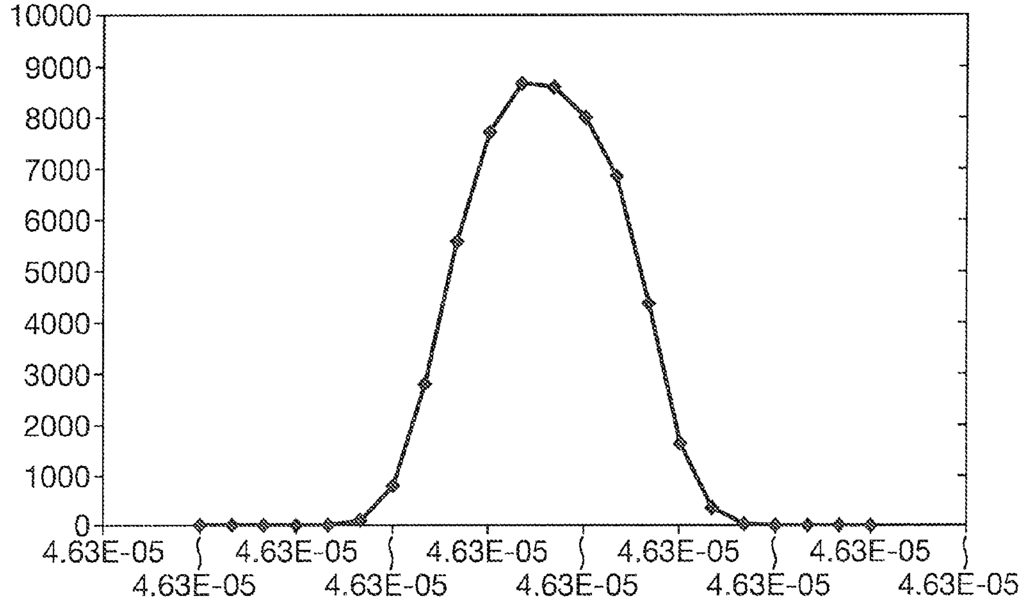

The mass spectral peak shown in FIG. 5B results from deliberately introducing a +/−130 μm tilt along one axis over the length of the ion beam (+/−15 mm) to the last grid at the exit of the Wiley-McLaren source (i.e. to the start of the field free or drift region). The effect of this tilt is to reduce the resolution to approximately 13,000 (FWHM).

Figure 6:
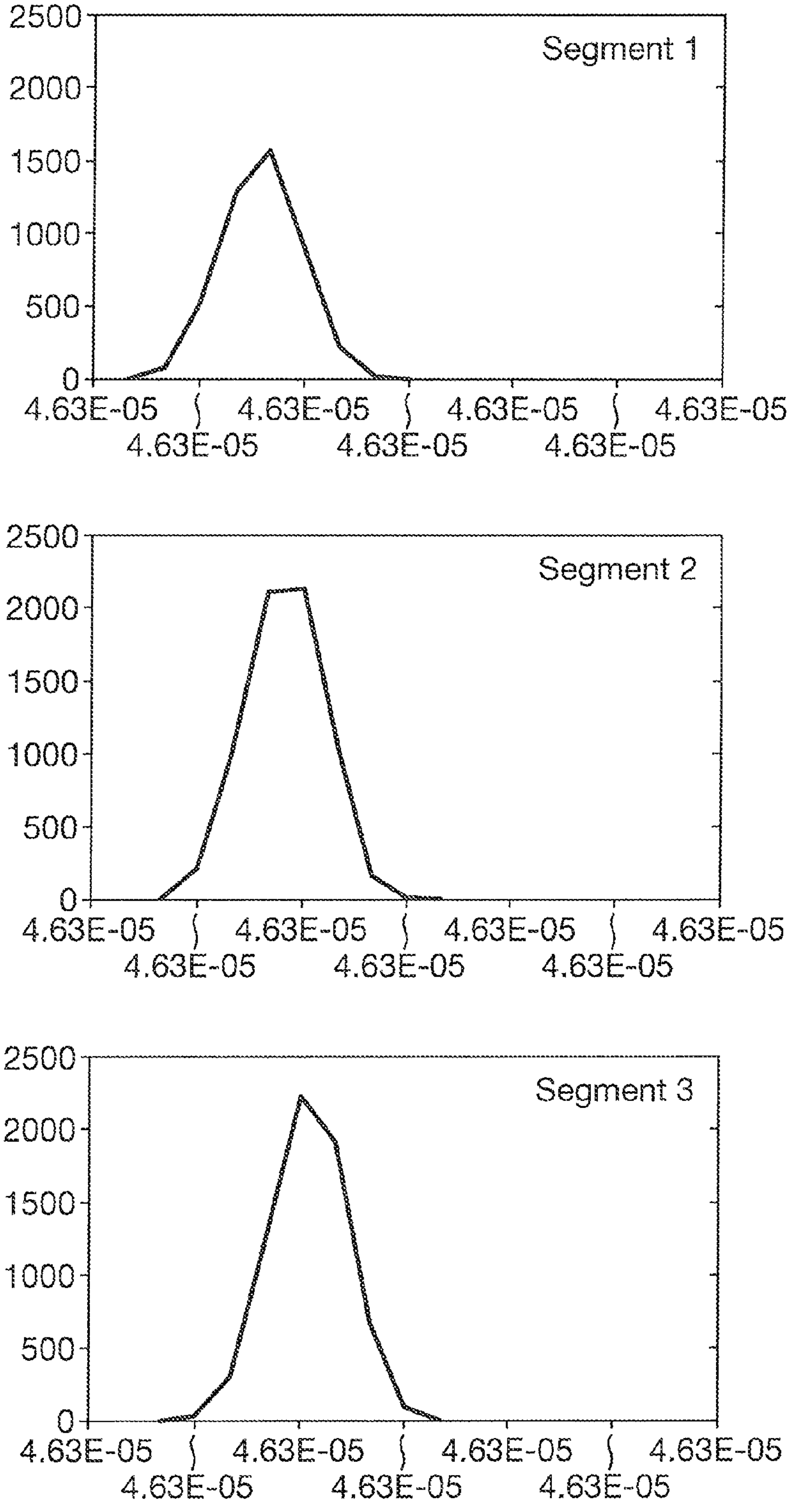
FIG. 6 shows data obtained from each of nine individual ion detector segments of an ion detector according to the preferred embodiment.

FIG. 6 shows the data obtained by each detector element if the positional information at the detector is maintained. The data shown in FIG. 6 corresponds with the embodiment shown in FIG. 4 wherein the ion detector is divided into nine equal length segments in the direction of the grid tilt.

Inspection of the data shown in FIG. 6 shows that each individual segment has optimal resolution (i.e. a resolution in the range 27,000-29,000). However, the mean arrival time determined by each detector element or segment varies leading to a degraded overall resolution as shown in FIG. 5B if the mass spectral data as determined by each detector element or segment is combined without the mass spectral data being corrected or otherwise calibrated.

Figure 7A:
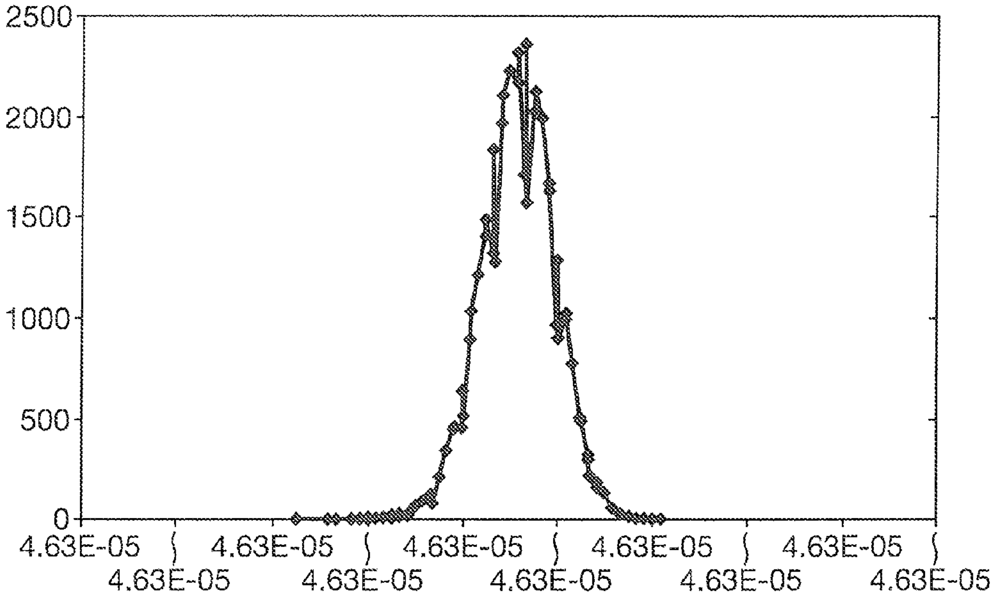
FIG. 7A shows the result of combining data from each of the nine segments according to an embodiment of the present invention and FIG. 7B shows data from an un-tilted grid for comparison purposes.

According to the preferred embodiment the response of each detector element or segment is preferably calibrated individually before the mass spectral data from each detector element or segment is combined to form a composite mass spectral data set. This results in the time of flight variability being removed and as a result the resolution is improved to approximately 27,000 as shown in FIG. 7A.

Figure 7B:
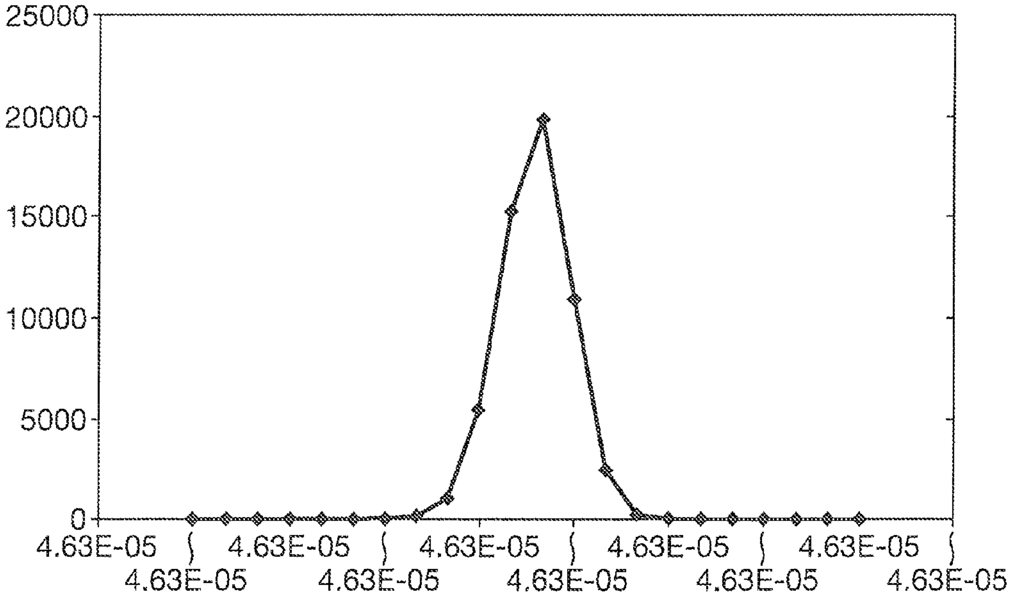

FIG. 7B shows data from an un-tilted grid and is included for comparison purposes.

Importantly, the calibration derived for each segment based on FIG. 6 applies to ions of all mass to charge ratio values. The calibration derived from FIG. 6 (m/z 1000) improves the resolution of m/z 500 from approximately 12,000 (FWHM) for the tilted grid case to approximately 25,000 (FWHM) which is comparable with the un-tilted grid resolution.

The ion detector according to an embodiment of the present invention and as shown in FIG. 4 is only able to correct for errors in a single dimension in this case a correction in the x-direction. In order to correct for errors in the y-direction, additional segments in the y-direction must also be included. Accordingly, further embodiments are contemplated wherein the ion detector comprises a two dimensional planar array of detector segments or elements.

For simplicity of explanation the aberration introduced which is observed in FIGS. 5B and 6 is linear in nature. However, it will be understood by those skilled in the art that the preferred ion detector system can also compensate for non-linear aberrations such as bowed or curved electrodes or grids, Other non-mechanical effects can be compensated for in accordance with the preferred embodiment. These include focusing lenses within the Time of Flight mass analyser and pusher offset type effects.

The calibrations which are preferably applied according to the preferred embodiment may deliberately include temporal offset terms such as those related to transit time of signals through or within the ion detector and those associated with delay times associated with different acquisition channels.

The calibrations which are preferably applied need not be linear—the calibrations may have higher order polynomial coefficients, exponential terms, logarithmic terms or trigonometric terms.

A yet further advantage of the preferred embodiment is that the effective sampling rate according to the preferred embodiment is increased due to the fractional bin corrections applied to each segment—see FIGS. 7A and 7B. The segmentation may take multiple forms such as multiple anodes or multiple detectors.

According to another embodiment the segmented ion detector according to the preferred embodiment may also be provided in combination with other devices such as one or more gimbals in order to compensate for space focusing effects.

Although the present invention has been described with reference to the preferred embodiments, it will be understood by those skilled in the art that various changes in form and detail may be made without departing from the scope of the invention as set forth in the accompanying claims.

The invention claimed is:

1. An ion detector system for a mass spectrometer, wherein said ion detector system is arranged and adapted to correct for tilt or one or more non-linear aberrations in an isochronous plane of ions, wherein said isochronous plane is the plane of best fit of ions having a particular mass to charge ratio at a particular point in time;

wherein said ion detector system comprises an ion detector comprising a 1D or 2D array of detector elements; and wherein said ion detector system is arranged and adapted:

(i) to generate separate first mass spectral data sets for each detector element;

(ii) to apply a calibration coefficient to each of said first mass spectral data sets to produce a plurality of second calibrated mass spectral data sets; and (iii) to combine said plurality of second calibrated mass spectral data sets to form a composite mass spectral data set.

2. An ion detector system as claimed in claim 1, wherein said tilt or non-linear aberrations in said isochronous plane results from misalignment of one or more ion-optical components.

3. An ion detector system as claimed in claim 1, wherein said one or more non-linear aberrations comprises bowing or rippling in said isochronous plane of ions due to one or more ion-optical components.

4. An ion detector system as claimed in claim 1, wherein said composite mass spectral data set relates to a single arrival event corresponding with a plurality of ions arriving at said ion detector at an instance in time.

5. An ion detector system as claimed in claim 1, wherein said detector system is arranged and adapted to generate a final mass spectrum by combining multiple composite mass spectral data sets.

6. A Time of Flight mass analyser comprising an ion detector system as claimed in claim 1.

7. A Time of Flight mass analyser as claimed in claim 6, wherein said Time of Flight mass analyser comprises an axial acceleration Time of Flight mass analyser.

8. A Time of Flight mass analyser as claimed in claim 6, wherein said Time of Flight mass analyser comprises an orthogonal acceleration Time of Flight mass analyser.

9. A Time of Flight mass analyser as claimed in claim 8, further comprising:

a pusher or puller electrode and a first grid or other electrode with a first field free region arranged between said pusher or puller electrode and said first grid or other electrode;

a second grid or other electrode and a second field free region arranged between said first grid or other electrode and said second grid or other electrode; and an orthogonal acceleration region arranged downstream of said second grid or other electrode.

10. A Time of Flight mass analyser as claimed in claim 9, further comprising a device arranged upstream of said orthogonal acceleration region and adapted to introduce a first order spatial focusing term in order to improve spatial focusing of a beam of ions.

11. A Time of Flight mass analyser as claimed in claim 9, further comprising a beam expander arranged upstream of said orthogonal acceleration region, said beam expander being arranged and adapted to reduce an initial spread of velocities of ions arriving at said orthogonal acceleration region.

12. A Time of Flight mass analyser as claimed in claim 9, further comprising a gimbal comprising two inclined electrodes, wherein said gimbal is located in said first field free region, said second field free region or said orthogonal acceleration region.

13. A Time of Flight mass analyser as claimed in claim 12, wherein said gimbal is arranged and adapted to correct for a linear or first order effect resulting from misalignment of one or more ion-optical components.

14. A mass spectrometer comprising a Time of Flight mass analyser as claimed in claim 6.

15. A method of detecting ions, wherein said method corrects for tilt or one or more non-linear aberrations in an isochronous plane of ions, wherein said isochronous plane is the plane of best fit of ions having a particular mass to charge ratio at a particular point in time;

said method comprising providing an ion detector system comprising an ion detector comprising a 1D or 2D array of detector elements; and wherein said method further comprises:

(i) generating separate first mass spectral data sets for each detector element;

(ii) applying a calibration coefficient to each of said first mass spectral data sets to produce a plurality of second calibrated mass spectral data sets; and (iii) combining said plurality of second calibrated mass spectral data sets to form a composite mass spectral data set.

16. A method of calibrating an ion detector comprising:

providing an ion detector comprising an array of detector elements;

detecting calibrant ions using said array of detector elements;

determining for each of said detector elements a time of flight of said calibrant ions; and determining a time of flight correction, a time of flight adjustment or a time of flight calibration coefficient for each detector element so that in subsequent operation said ion detector is arranged and adapted to correct for the effects of tilt and/or or one or more non-linear aberrations in one or more isochronous planes of ions.

17. An ion detector comprising an array of detector elements, wherein said ion detector is arranged and adapted:

(i) to detect calibrant ions using said array of detector elements;

(ii) to determine for each of said detector elements a time of flight of said calibrant ions; and (iii) to determine a time of flight correction, a time of flight adjustment or a time of flight calibration coefficient for each detector element so that in subsequent operation said ion detector is arranged and adapted to correct for the effects of tilt or one or more non-linear aberrations in one or more isochronous planes of ions.

* * * * *